(12) United States Patent
Sbetti et al.

(10) Patent No.: US 8,981,258 B2
(45) Date of Patent: Mar. 17, 2015

(54) METHODS FOR CONTROLLING LASER CUTTING PROCESSES AND LASER CUTTING SYSTEMS IMPLEMENTING SAME

(75) Inventors: Maurizio Sbetti, Levico Terme (IT); Stefano Bertoldi, Pergine Valsugana (IT); Daniele Colombo, Renate (IT); Barbara Previtali, Bonate Sopra (IT); Giovanni Riva, Vercurago (IT); Matteo Danesi, Montichiari (IT); Lorenzo Molinari Tosatti, Bergamo (IT); Diego Parazzoli, Milan (IT)

(73) Assignee: Adige S.p.A., Levico Terme (TN) (IT)

( * ) Notice: Subject to any disclaimer, the term of this patent is extended or adjusted under 35 U.S.C. 154(b) by 0 days.

(21) Appl. No.: 14/112,548

(22) PCT Filed: Apr. 20, 2012

(86) PCT No.: PCT/IB2012/051992
§ 371 (c)(1),
(2), (4) Date: Oct. 18, 2013

(87) PCT Pub. No.: WO2012/143899
PCT Pub. Date: Oct. 26, 2012

(65) Prior Publication Data
US 2014/0034614 A1 Feb. 6, 2014

(30) Foreign Application Priority Data
Apr. 21, 2011 (IT) ............... TO2011A0352

(51) Int. Cl.
*B23K 26/38* (2014.01)
*B23K 26/12* (2014.01)
(Continued)

(52) U.S. Cl.
CPC ............... *B23K 26/12* (2013.01); *B23K 26/032* (2013.01); *B23K 26/063* (2013.01);
(Continued)

(58) Field of Classification Search
CPC ...... B23K 26/32; B23K 26/063; B23K 26/12; B23K 26/123; B23K 26/1476; B23K 26/38; B23K 2201/18; B23K 2203/04
USPC ............. 219/121.72, 121.71, 121.62, 121.83; 356/318
See application file for complete search history.

(56) References Cited

U.S. PATENT DOCUMENTS 5,204,517 A * 4/1993 Cates et al. ............. 219/121.62
(Continued)

FOREIGN PATENT DOCUMENTS

DE 19607376 A1 8/1997
DE 10060407 A1 * 6/2002
(Continued)

OTHER PUBLICATIONS

Cremers et al., "Handbook of Laser-Induced Breakdown Spectroscopy", Dec. 2006, John Wiley & Sons, pp. 1-283.*
(Continued)

*Primary Examiner* — Geoffrey S Evans
(74) *Attorney, Agent, or Firm* — Robert E. Alderson, Jr.

(57) ABSTRACT

Laser cutting processes are provided which are controlled using as a reference signal one or more emission lines which are characteristic of the radiation emitted by a gas or, more generally, by an emitting element present in the volume irradiated by the laser beam focussed by a laser head and adjusting, on the basis of this reference signal, at least one of the following process control parameters: the power of the laser, the frequency and the duty cycle of the laser pulse, the pressure of an assisting gas emitted by a nozzle forming part of the laser head, the relative speed of the laser head with respect to the workpiece, the distance between the laser head and the surface of the workpiece, and the distance between the focal point of the laser beam and the surface of the workpiece. Laser cutting devices are also provided.

12 Claims, 6 Drawing Sheets

(51) Int. Cl.
    *B23K 26/03* (2006.01)
    *B23K 26/06* (2014.01)
    *B23K 26/14* (2014.01)

(52) U.S. Cl.
    CPC .......... *B23K 26/123* (2013.01); *B23K 26/1476* (2013.01); *B23K 26/38* (2013.01); *B23K 2201/18* (2013.01); *B23K 2203/04* (2013.01)
    USPC ............ 219/121.67; 219/121.72; 219/121.83

(56) References Cited

U.S. PATENT DOCUMENTS

| | | | |
|---|---|---|---|
| 5,373,135 A | 12/1994 | Beyer et al. | |
| 2005/0011867 A1* | 1/2005 | Okuda et al. | 219/121.83 |
| 2009/0127233 A1* | 5/2009 | Asano et al. | 219/121.7 |
| 2009/0273782 A1* | 11/2009 | Yoo et al. | 356/318 |
| 2011/0100967 A1* | 5/2011 | Yoo et al. | 219/121.73 |
| 2011/0284510 A1* | 11/2011 | Reeves-Hall et al. | 219/121.72 |
| 2012/0000893 A1* | 1/2012 | Broude et al. | 219/121.69 |
| 2012/0156875 A1* | 6/2012 | Srinivas et al. | 219/121.72 |
| 2013/0213946 A1* | 8/2013 | Morikazu | 219/121.85 |

FOREIGN PATENT DOCUMENTS

| | | |
|---|---|---|
| EP | 0470583 A2 | 2/1992 |
| WO | WO-02/29853 A2 * | 4/2002 |

OTHER PUBLICATIONS

Dadras et al., "Characterization and comparison of iron and aluminum laser ablation with time-integrated emission spectroscopy of induced plasma", Oct. 2008, Journal of Physics D: Applied physics, vol. 41 pp. 225202-225209.*

* cited by examiner

METHODS FOR CONTROLLING LASER CUTTING PROCESSES AND LASER CUTTING SYSTEMS IMPLEMENTING SAME

CROSS-REFERENCE TO RELATED APPLICATIONS

This application is a National Phase Application of PCT International Application No. PCT/IB2012/051992, International Filing Date, Apr. 20, 2012, claiming priority to Italian Patent Application No. TO2011A000352, filed Apr. 21, 2011, each of which is hereby incorporated by reference in its entirety.

FIELD OF THE INVENTION

The present invention refers in general to the field of the laser cutting processes, and more precisely to a method for controlling a laser cutting process, as well as to a laser cutting system implementing such a method.

BACKGROUND OF THE INVENTION

The expression "laser cutting process" is intended to refer, for the purposes of the present invention, to a process in which a laser beam focussed on the surface of a workpiece, or near that surface, produces a transformation of the material of the workpiece hit by the laser beam to obtain first a through hole and then a cut line starting from this through hole. The relative movement of the laser beam with respect to the workpiece determines the overall area, or volume, of material involved by the process. Typically, the transformation of the material due to the process is either a transformation of mechanical type (deformation) or a transformation of physical type (phase transition by fusion, evaporation or sublimation) and is due to the following two main factors, combined in variable proportions:
 a) the heat supplied by the focussed laser beam; and
 b) the heat supplied by a chemical reaction caused by a so-called assisting gas, provided such a reaction is an exoenergetic one (typically a reaction of combustion, or more generally a reaction involving the combination of the assisting gas with the material of the workpiece).

In case the heat supply indicated above with b) must not be provided for, the assisting gas is an inert gas (such as for instance $N_2$, Ar or He) and has the function of shielding or of mechanical propulsion (i.e. it serves to blow away the material which has fused, evaporated or sublimated as a result of the heat supplied by the laser beam).

On the contrary, in case the heat supply indicated above with b) must be equal to or larger than 40% of the total energy supply, the assisting gas is a reactive gas and acts as energy-yielding means or as comburent. The role of the assisting gas in the laser working process is therefore in this case to yield energy to the process by means of an exoenergetic reaction, with two simultaneous effects on the process: 1) increase in the temperature of the volume of material involved, which results in a physical change of state due to thermal effect (plasticization, fusion, evaporation or sublimation); and 2) self-sustainment of the reaction, in that the temperature of the volume of material involved and the available heat energy ensure the conditions required to cause and sustain the exoenergetic reaction. An example of assisting gas of reactive type is oxygen ($O_2$), which is used in laser working operations performed on carbon steel alloys, since it is able to sustain a reaction of oxidization of the iron contained in the steel.

Laser piercing as a preliminary phase of cutting is usually carried out with no relative movement of the laser beam with respect to the workpiece and is aimed at causing breaking of the wall of material in view of the subsequent cutting process. Laser piercing is carried out with an optical configuration and with a position of the focal point relative to the material which must be also compatible with the cutting process which takes place immediately after the wall of material has been broken. Laser piercing takes place in a volume which remains closed until the end of the process. As schematically illustrated in FIG. 1 of the attached drawings, the laser piercing process involves first the surface S of the workpiece P, then evolves creating a cylinder which comprises, starting from the optical axis A of the laser beam, a space which collects evaporated/sublimated, fused and heated material, in an atmosphere which comprises the assisting gas, possible by-products deriving from chemical reactions between the material of the workpiece and the copresent gases, as well as possible other gases contained in the air in which the workpiece being processed is placed, which gases are present as contaminants.

Differently from piercing, the laser cutting process provides for a relative movement of the focussed laser beam with respect to the workpiece. Moreover, as schematically shown in FIG. 2 of the attached drawings, the laser cutting process takes place in an open volume defined by three surfaces, namely by a pair of flat surfaces S1, S2 which extend parallel to the direction of the relative movement of the focussed laser beam with respect to the workpiece, and by a third surface S3 which connects the first two surfaces and represents the leading edge of the cut. As schematically shown in FIG. 3 of the attached drawings, which is a section view of a wall of material being cut by means of laser, which view is taken through a section plane parallel to the direction of the cut, the leading edge of the cut is formed by various layers of heated, fused and evaporated/sublimated material, in an atmosphere which comprises the assisting gas, possible by-products deriving from chemical reactions between the material of the workpiece being processed and the copresent gases, as well as possible other gases contained in the air in which the workpiece is placed, which gases are present as contaminants.

Document U.S. Pat. No. 5,373,135 discloses a method for controlling a laser cutting process based on setting two temperature thresholds, namely a minimum temperature threshold and a maximum temperature threshold, respectively, corresponding to the fusion temperature of the material being processed and to a temperature comprised between the fusion temperature and the evaporation temperature of the material being processed, and on measuring the temperature by measuring the light intensity. When the measured temperature is higher than the predetermined maximum threshold, then the laser is switched off, whereas when the measured temperature is lower than the predetermined minimum threshold, then the laser is switched on. The control parameter of this known method is therefore the temperature.

SUMMARY OF THE INVENTION

That being stated, it is an object of the present invention to provide a method for controlling a laser cutting process of the above-identified type, irrespective of whether the process is carried out with a reactive gas or with an inert gas, with a $CO_2$ laser or with a solid-state laser (Nd:YAG, fiber laser, disc laser, diode laser), which method allows to minimize the risk that the process goes out of control and enters a paroxysmal state in case of a process using a reactive gas as assisting gas, allows to minimize the risk of closure of the kerf, and therefore the risk of interruption of the process, and also allows to improve the quality of the final result of the process with respect to the one obtainable with the control methods already used for control of laser cutting processes.

This and other objects are fully achieved by the present invention by methods for controlling laser cutting processes including the steps described and claimed herein.

According to further aspects of the present invention, this and other objects are fully achieved by laser cutting systems having the features described and claimed herein.

Further advantageous modes of implementation of the control methods according to the invention and advantageous embodiments of laser cutting systems according to the present invention are described and claimed herein.

In short, the invention is based on the idea of controlling the laser cutting process, including the initial piercing phase, by using as reference signal one or more emission lines specific for the radiation emitted by a gas (be it an assisting gas or a contaminant gas) or, more generally, by any emitting element present in the volume involved by the irradiation of the focussed laser beam and by adjusting, on the base of this reference signal, at least one of the following process control parameters: the power of the laser, the frequency and duty cycle of the laser pulse, the pressure of the assisting gas, the relative speed of the laser with respect to the workpiece, the distance between the laser head and the surface of the workpiece, and the distance between the focal point of the laser beam and the surface of the workpiece.

The control method according to the invention provides therefore for implementing a control loop comprising the following steps:
- the radiation coming from the volume involved by the laser process is detected by sensor means operating in a band centred on a wavelength previously chosen as the most suitable one for controlling the process;
- the signal thus detected is suitably filtered and processed and then sent as input to an electronic control unit; and
- the electronic control unit interprets the signal received as input and, if necessary, changes one of the above-indicated process control parameters.

Preferably, the emission lines specific for the radiation which is monitored for the purpose of control of the process (hereinafter referred to as control radiation) are comprised in the range from 180 to 2000 nm and are detected with a bandwidth which is not wider than 100 nm.

Preferably, oxygen or nitrogen are used as emitting gas. In general terms, it is possible to use as emitting gas a gas which is able to emit in the band comprised between 180 nm and 2000 nm, when it is present inside the volume involved by the laser working process, as a result of the temperature, of the direct interaction with the laser, of transitions to the ionized state or of transitions among roto-vibrational modes of possible compounds produced by the process due to the combination of the gas with the material being processed. The gas used as emitting gas may indifferently be an assisting gas or a contaminant gas. In this second case, the gas may indifferently be either a gas normally present in the atmosphere around the workpiece being processed or a gas expressly introduced for this purpose into the volume involved by the laser process.

In case a gas is used as the element emitting the radiation to be detected, the control method is based on the following remarks.

If the gas has a mainly reactive function, its emissions can be interpreted as indicative of the level of the intensity with which the reaction process is occurring: a too low level means that the reaction process is not occurring with the rate that would be possible, whereas a too high level means that the reaction process is occurring with an excessive rate, hence with the risk of a situation of uncontrolled or explosive process. In case of a pulsed laser, the derivative of the signal or the minimum level reached by a laser switched-off before the subsequent pulse can give an indication that the process will tend to reduce or increase its intensity, thus becoming on the one hand inefficient and on the other hand uncontrolled or explosive. The same information can be obtained also in case of a continuous laser, by introducing an overmodulation on the laser power and comparing the time derivatives of the signal emitted by the gas during the undermodulation step and during the overmodulation step. Another type of control can be obtained by comparing the levels of emission of radiation at two or more different wavelengths, which indicate the presence or the transformation of at least two specific chemical species or compounds inside the volume involved by the laser working process.

If the gas has the function of contaminant, be it normally present in the atmosphere around the workpiece being processed or expressly introduced in the process for this purpose, its emissions can be interpreted as control signal even in case of a laser cutting process using an inert gas as assisting gas. In case of laser piercing carried out in preparation of cutting, the signal emitted by the contaminant gas gives the information that the piercing cylinder is still closed and that therefore the process is not finished yet. Once the opening in the material has been formed, the control signal decreases significantly and thus shows that the process has come to an end. In case of the laser cutting, an increase in the signal emitted by the contaminant gas gives the information that the leading edge of the cut is tending to become parallel to the surface of the workpiece being processed, thereby expelling less material, less by-products and less contaminant gas, and that therefore the forward speed of the cut is too high, whereas a decrease in the signal emitted by the contaminant gas gives the information that the leading edge of the cut is tending to become perpendicular to the surface of the workpiece being processed, and that therefore the forward speed of the cut is too low.

Preferably, the control method according to the invention provides for monitoring the emission line at 777 nm. This wavelength includes a strong emission from the ionized oxygen, which can be easily detected even when the oxygen is present only as contaminant gas in the process, and more specifically gives the information required for control both of the laser piercing in preparation of cutting and of the laser cutting. In case of a laser piercing process under oxidizing conditions, with the use of oxygen as assisting gas, this wavelength gives a very sensitive anticipation on the rising ramp of the amount of ionized oxygen present in the process volume, which ramp forebodes an explosion. In case of a fusion laser piercing process, with the use of nitrogen as assisting gas, this wavelength gives a very sensitive information about the presence of a still closed volume which is being fused before opening. In case of a laser cutting process, irrespective of whether it is carried out under oxidizing conditions or it is a fusion laser cutting process, this wavelength represents a rich source of information, as it provides both an anticipation of the risk of explosion or lateral diffusion of the oxidizing process, resulting in a reduction in the final quality of the cut, and an anticipation of the phenomenon of the closure of the kerf, and of the associated loss of the cut, independently of the upstream reasons which have led to the closure.

In addition to signals emitted by gases, irrespective of whether they are assisting gases or contaminant gases, it is possible according to the invention to use also signals emitted by the metal elements contained in the material being processed, irrespective of whether they are characterizing elements of the material or elements only present as contaminants. For instance, it is possible to use iron, nickel, chromium, aluminium or copper as emitting elements.

The monitoring of the signal emitted by a gas or by another emitting element present in the volume of material involved by the laser working process allows therefore to obtain information on the state of the process and hence to control the process by adjusting the above-mentioned process control parameters.

With regard to the laser cutting system implementing the control method according to the invention, it basically comprises:

- a laser source, which may indifferently be of the $CO_2$ type or of the solid-state type (Nd:YAG, fiber laser, disc laser, diode laser);
- a laser head comprising a focussing device for focussing the laser beam generated by the laser source and a nozzle for supplying the assisting gas;
- an optical path arranged to transport the laser beam generated by the laser source to the focussing device of the laser head;
- a driving device arranged to move the laser head and the workpiece with respect to each other with an adjustable speed, as well as to control the pressure of the assisting gas, to adjust the distance of the nozzle from the surface of the workpiece and to adjust the position of the focal point of the laser beam relative to the surface of the workpiece; and
- a process control device comprising sensor means for detecting at least one predetermined wavelength band of the radiation emitted by a given gas or a given material present in the volume of material involved by the irradiation of the focussed laser beam, signal processing means for processing the signal detected by the sensor means, and control means for controlling, on the base of the signal received by the signal processing means, the laser source and/or the driving device to adjust at least one of the following process control parameters: the power of the laser, the frequency and the duty cycle of the laser pulse, the pressure of the assisting gas, the relative speed of the laser head with respect to the workpiece, the distance between the nozzle of the laser head and the surface of the workpiece, and the distance between the focal point of the laser beam and the surface of the workpiece.

According to an embodiment, the sensor means comprise a photodiode for detecting the predetermined wavelength band(s), a reflector/deflector device arranged to direct onto the photodiode the radiation emitted by the laser working process and an optical filter device interposed between the photodiode and the reflector/deflector device to select the predetermined wavelength band(s).

According to an embodiment, the sensor means comprise a plurality of photodiodes for detecting the predetermined wavelength band(s), a corresponding plurality of reflector/deflector devices arranged each to direct onto a respective photodiode the radiation emitted by the laser working process and a corresponding plurality of optical filter devices interposed each between a respective photodiode and a respective reflector/deflector device to select the predetermined wavelength band(s).

Irrespective of the number of photodiodes, of reflector/deflector devices and of optical filter devices used as sensor means, the (or each) optical filter device can work in transmission or in reflection. In this second case, the (or each) optical filter device can coincide with the reflector/deflector device arranged to direct onto the photodiode the radiation emitted by the laser working process. The sensor means can be placed indifferently above or below the focussing device of the laser head.

In case of a laser source of the solid-state type (Nd:YAG, fiber laser, disc laser, diode laser), the optical path comprises a transport fiber and the laser head further comprises a collimation device, which is connected to the final end of the transport fiber and comprises one or more collimation lenses.

In this case, the reflector/deflector device may comprise, between the collimation device and the focussing device, a 90-degree deflector arranged to reflect at least the 99.9% of the laser radiation and to transmit instead the radiation in the predetermined wavelength band(s). In this case, preferably the sensor means further comprise a focussing lens arranged between the deflector and the photodiode to focus the signal detected onto the photodiode. Moreover, the optical filter device is preferably arranged between the deflector and the focussing lens and comprises a first optical filter arranged to cut down the laser radiation and a second optical filter arranged to select the predetermined wavelength band(s). This also fully applies where a plurality of photodiodes, of reflector/deflector devices and of optical filter devices are provided, in which case each reflector/deflector device will comprise a respective deflector and a respective focussing lens will be provided between each deflector and the respective photodiode.

As an alternative to a 90-degree deflector, a branching device can be provided, which is arranged along the optical path and is configured so as to allow the laser beam generated by the laser source to be fully transported to the laser head through the transport fiber and to the radiation which is emitted by the laser working process and is transported through the transport fiber to be directed onto the photodiode.

According to an embodiment, the branching device is integrated in an optical coupling device by means of which the laser generated by the laser source is launched in the transport fiber and comprises in particular a beam splitter arranged between a collimation lens and a focussing and launching lens of the optical coupling device so as to allow the laser beam generated by the laser source to fully pass through the focussing and launching lens and to the radiation which is emitted by the laser working process and is transported through the transport fiber to be directed onto the photodiode.

According to an embodiment, the branching device comprises a secondary fiber welded to the transport fiber. In case an optical coupling device is provided, by means of which the laser generated by the laser source is launched in the transport fiber, the secondary fiber is welded to the transport fiber in a point of this latter positioned downstream of the optical coupling device. Alternatively, the optical coupling device can be omitted and the secondary fiber can be welded in the same point as the one where the transport fiber is welded to the laser source. In this case, it is particularly advantageous if the secondary fiber is welded to an optical combiner to which a plurality of fibers are welded, which fibers are connected each to a respective laser module which forms part of the laser source and is able to emit a laser beam independently of the other laser modules.

Further features and advantages of the invention will become more evident from the following detailed description, which is given purely by way of non-limiting example with reference to the attached drawings briefly described below.

DETAILED DESCRIPTION

Figure 1:
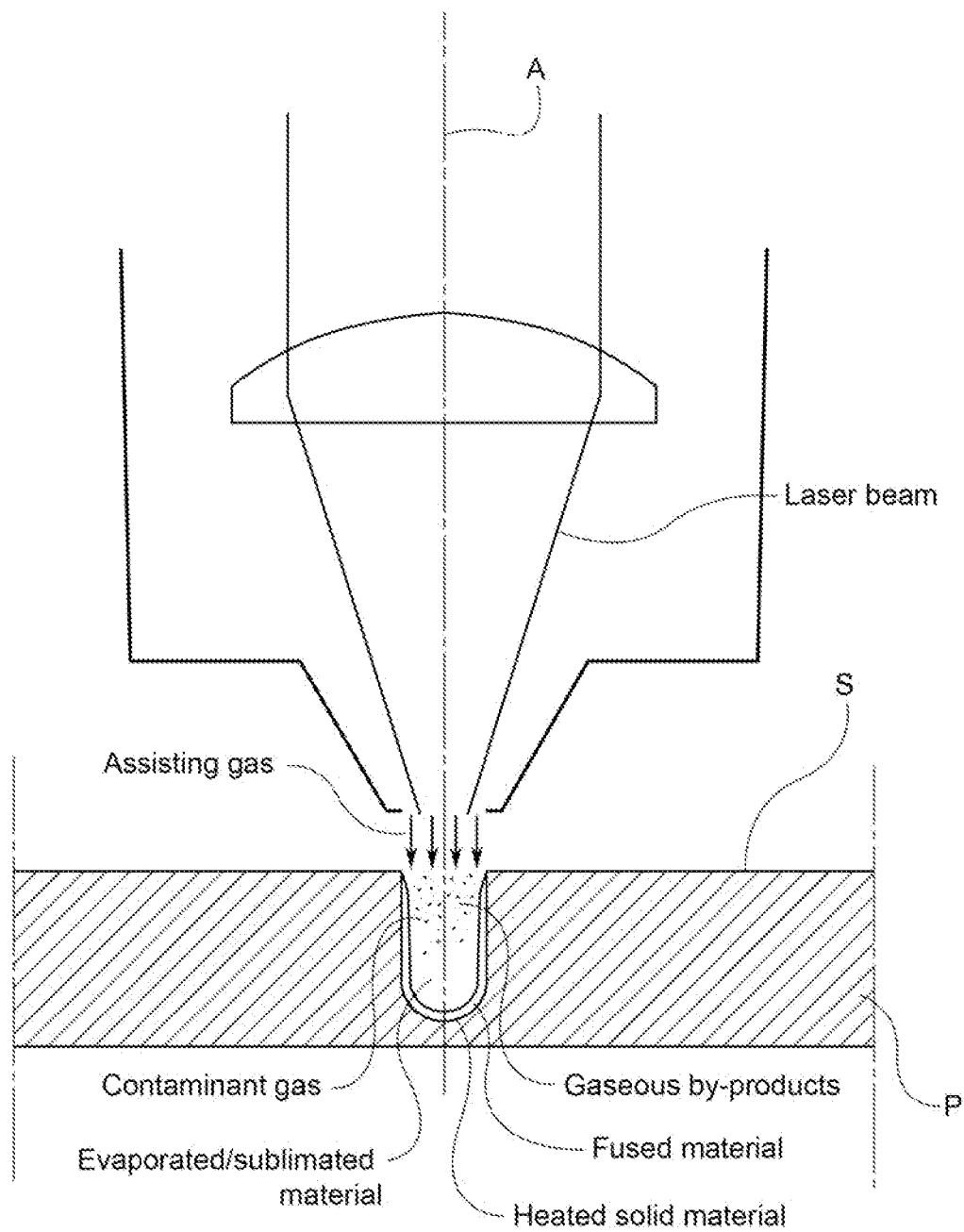
FIG. 1 schematically shows the volume of material involved by a laser piercing process.
Figure 2:
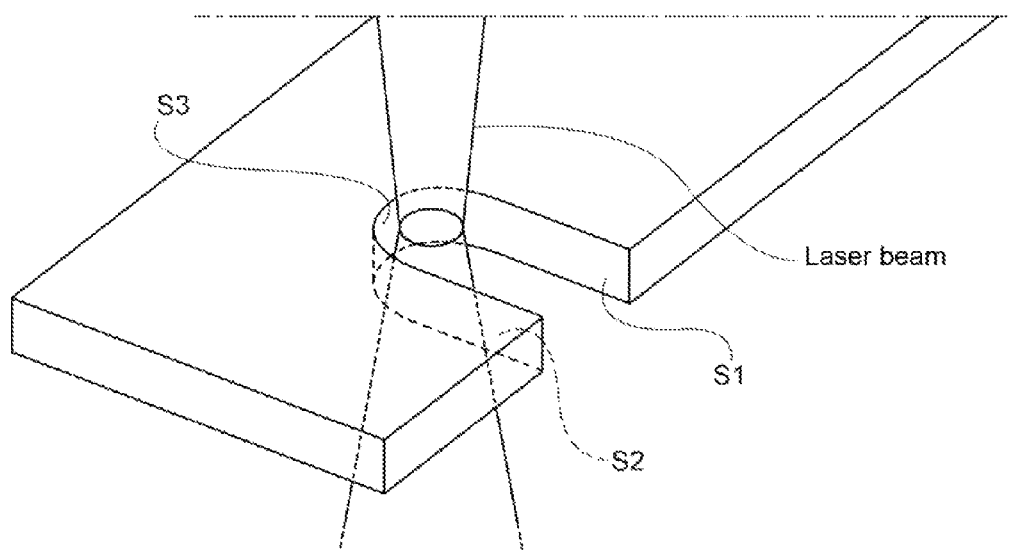
FIGS. 2 and 3 schematically show the volume of material involved by a laser cutting process.
Figure 3:
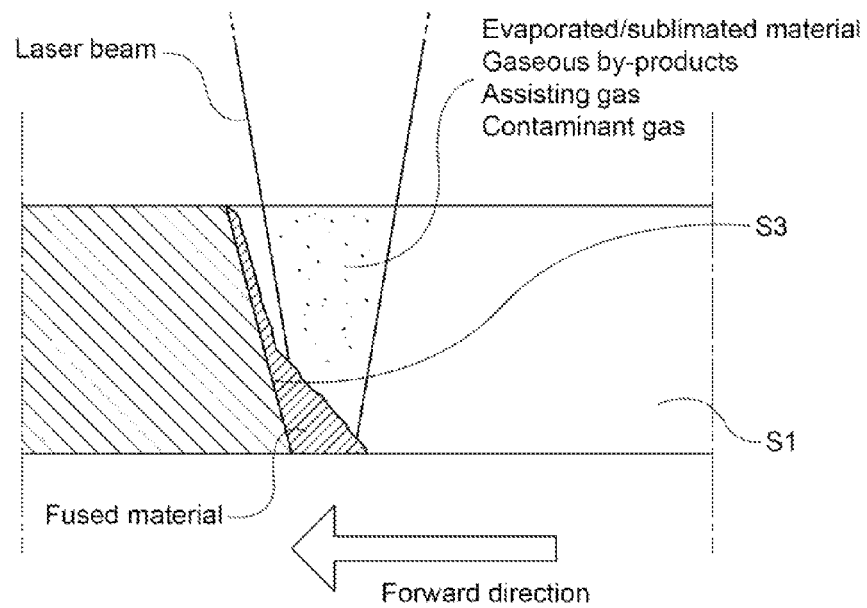
Figure 4:
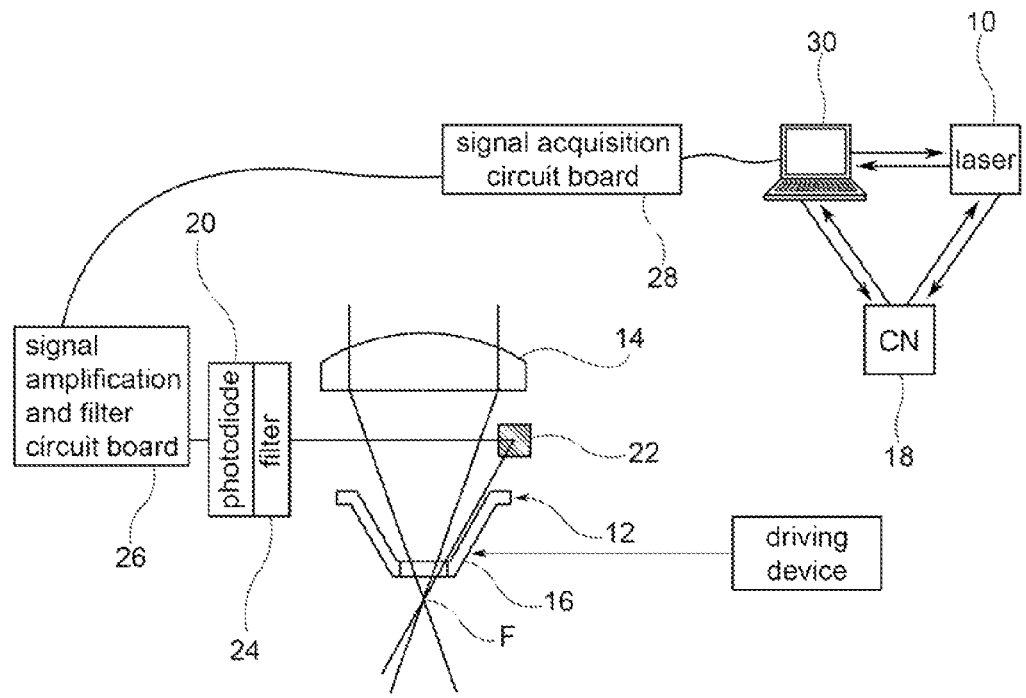
FIG. 4 schematically shows a process control device for a laser cutting system according to the invention.

With reference first to the schematic illustration of FIG. 4, a laser cutting system according to the invention basically comprises:

- a laser source 10, which may indifferently be of the $CO_2$ type or of the solid-state type (Nd:YAG, fiber laser, disc laser, diode laser);
- a laser head which is generally indicated 12 and comprises a focussing device 14 for focussing the laser beam generated by the laser source 10 and a nozzle 16 for supplying an assisting gas (which may indifferently be an inert gas, such as for instance nitrogen, or a reactive gas, such as for instance oxygen), the nozzle 16 having an outlet hole preferably of circular cross-section;
- an optical path (not illustrated, but of per-se-known type) arranged to transport the laser beam generated by the laser source 10 to the focussing device 14 of the laser head 12, wherein the optical path can be formed either by an assembly of mirrors or by a transport fiber;
- a driving device (not illustrated, but of per-se-known type) arranged to move the laser head 12 and the workpiece with respect to each other with an adjustable relative speed, as well as to control the pressure of the assisting gas, to adjust the distance of the nozzle 16 from the surface of the workpiece and to adjust the position of the focal point F of the laser beam relative to the surface of the workpiece being processed, the driving device being controlled by a numerical control 18; and
- a process control device arranged to control the laser source 10 and/or the driving device (through the numerical control 18) so as to adjust at least one of the following process control parameters: the power of the laser, the frequency and the duty cycle of the laser pulse, the pressure of the assisting gas, the relative speed of the laser head 12 with respect to the workpiece, the distance between the nozzle 16 and the surface of the workpiece, and the distance between the focal point F of the laser beam and the surface of the workpiece being processed.

More specifically, the process control device comprises sensor means for detecting at least one predetermined wavelength band of the radiation emitted by a given gas or by a given material present in the volume of material involved by the irradiation of the focussed laser beam (hereinafter indicated, for the sake of easiness, as process volume), signal processing means for processing the signal detected by the sensor means, and control means for controlling, on the base of the signal received by the signal processing means, the laser source and/or the driving device to adjust at least one of the above-mentioned process control parameters.

The sensor means comprise a photodiode 20 for detecting, preferably with a dynamic range of at least one decade, the predetermined wavelength band(s), a reflector/deflector device 22 arranged to direct onto the photodiode 20 the radiation emitted by the process volume and an optical filter device 24 interposed between the photodiode 20 and the reflector/deflector device 22 to select the predetermined wavelength band(s). The optical filter device 24 may work in transmission or in reflection. In this second case, the optical filter device 24 may coincide with the reflector/deflector device 22. The radiation emitted by the process volume is therefore directed by the reflector/deflector device 22, through the optical filter device 24, onto the photodiode 20, which detects the predetermined wavelength band(s). As shown in FIGS. 5A and 5B, the sensor means may comprise a plurality of photodiodes 20 (in the illustrated example, four photodiodes), as well as a corresponding plurality of reflector/deflector devices 22 and optical filter devices 24, arranged in such a manner that each reflector/deflector device 22 directs onto a respective photodiode 20, through a respective optical filter device 24, the radiation emitted by the process volume in a given angular range. The sensor means may be positioned indifferently above or below the focussing device 14 of the laser head 12.

The signal processing means comprise a signal amplification and filter circuit board 26, which is for instance directly connected to the photodiode 20, and a signal acquisition circuit board 28 connected to the signal amplification and filter circuit board 26 to acquire the signal coming from this latter.

The control means comprise an electronic control unit 30 (for instance an industrial PC) on which a control software is installed which performs a control algorithm described in detail further on. The electronic control unit 30 is connected on the one hand to the signal acquisition circuit board 28 and on the other, through a communication line with input and output interface, both to the laser source 10 and to the numerical control 18, so as to be able to control directly the laser source 10 to adjust the power, the frequency and the duty cycle of the laser, and indirectly, through the numerical control 18, the driving device to adjust the remaining process control parameters mentioned above, namely the relative speed, the pressure of the assisting gas, the distance of the nozzle from the material and the position of the focal point relative to the material.

The aforesaid process control parameters are adjusted on the base of the signal relating to the predetermined wavelength band(s) detected by the sensor means. According to the invention, there is used, as predetermined wavelength band, a wavelength band selected in such a manner as to include at least one emission line of an emitting element (which may be a gas or a metal) present in the process volume. Preferably, the emission lines monitored for the purposes of control of the process are comprised in the range from 180 to 2000 nm and are detected with a bandwidth not wider than 100 nm. Preferably, in case a gas is used as emitting element, this gas is oxygen or nitrogen.

The radiation emitted by the oxygen has emission lines at the following wavelengths (in nm): 948, 845, 823, 795 and 777. Preferably, the control method according to the invention provides for monitoring of the last emission line mentioned above, and therefore for acquiring the signal at 750 nm, with a pass-band equal to ±50 nm. As already stated in the introductory part of the description, this wavelength comprises a strong emission by the ionized oxygen, which can be detected easily even when the oxygen is only present as contaminant in the process, and specifically gives the information required to control the laser cutting, as well as to control the piercing operation in preparation of cutting. This wavelength is used according to the invention on the one hand as an information about the tendency of the amount of ionized oxygen in the process volume to increase, which tendency usually anticipates an explosion of the piercing or of the cut, and on the other as an index of the amount of collected contaminant, and therefore as an index of not-yet-completed piercing or of a tendency to the closure of the kerf.

As far as nitrogen is concerned, the emitted radiation by this gas has emission lines at the following wavelengths (in nm): 1358, 1246, 939, 870, 860, 745 and 576. In this case, the following wavelengths (in nm) shall be monitored, with a pass-band equal to ±50 nm: 1350, 1250, 950, 850, 750 and 550.

In addition to signals emitted by a gas, be it an assisting gas or a contaminant gas, it is possible to use also signals emitted by metal elements contained in the process volume, independently of whether they are characterizing elements of the material or elements present as contaminants.

In this connection, the control method according to the invention preferably provides for monitoring the radiation emitted by the iron. In case of a workpiece made of carbon steel, the radiation emitted by the iron contained in the material of the workpiece has emission lines in a first band at 517-521 nm and in a second band at 550-600 nm. In this case, it will be sufficient to monitor, with a pass-band equal to ±50 nm, the wavelength at 550 nm. In case of a workpiece made of stainless steel, the radiation emitted by the iron contained in the material of the workpiece has emission lines comprised, in addition to the two bands indicated above, in a third band at 480-500 nm.

The monitoring of the wavelength at 550 nm, with a pass-band equal to ±50 nm, can also be used when the material being processed is aluminium or an aluminium alloy, since the radiation emitted by the aluminium has emission lines comprised in a band at 518-548 nm.

It is also possible to use as emitting element the nickel, whose emitted radiation has emission lines at the following wavelengths (in nm): 361, 352, 349 and 341. In this case, it will be sufficient to monitor, with a pass-band equal to ±50 nm, the wavelengths at 350 nm.

Moreover, it is possible to use as emitting element the chromium, whose emitted radiation has emission lines at the following wavelengths (in nm): 427 and 359. In this case, it will be sufficient to monitor, with a pass-band equal to ±50 nm, the wavelengths at 450 nm and at 350 nm.

In case the copper is chosen as emitting element, whose emitted radiation has an emission line at 325 nm, it will be sufficient to monitor, with a pass-band equal to ±50 nm, the wavelength at 350 nm.

In order to carry out the laser piercing in preparation of cutting, an example of control algorithm which can be used by the control means of the laser working system to adjust the process control parameters provides for the steps described here below.

a) First of all, the presence of the material in which to make the hole is checked. For this purpose, a first laser pulse train is sent onto the material by means of the laser head and the signal relating to the predetermined wavelength band(s) is detected by the sensor means. If the detected signal is too low with respect to a predetermined threshold, this information is interpreted by the control means as indicating the absence of the material or as indicating that a hole has already been made before.

b) Once the presence of the material has been confirmed, the laser working process is started with suitable values of the process control parameters indicated above. In particular, the laser source is on for a certain predetermined time interval, at the end of which the laser source is switched off. Specifically, if the process takes place in an environment rich in oxygen (used as assisting gas), then the time interval during which the laser source is on varies in the range from 0.5 to 5 msec (preferably 1 msec). If, on the contrary, the oxygen is present only as contaminant gas, then the time interval during which the laser source is on varies in the range from 0.5 to 100 msec (preferably 50 msec).

c) After a certain time (relaxation time) from the switching off of the laser source, the radiation emitted in the predetermined wavelength band(s) is detected by the sensor means and its course is monitored. If the detected signal falls below a given re-ignition threshold, then step b) is repeated, i.e. the laser source is switched on again. During the monitoring of the control signal, the control means can also measure the time derivative of this signal and use this derivative as an indication of the robustness of the adjustment procedure.

The process ends when the detected signal falls below a given end-of-process threshold. Preferably, the end-of-process control is performed in the time interval during which the laser source is on.

The values of the re-ignition and of end-of-process thresholds depend on the material and on the thickness of the workpiece. Preferably, these values are not fixed, but are dynamically changed by the control means in case these latter establish, on the base of the measured time derivative of the control signal, that the process is not very robust.

In order to carry out a laser cutting operation, an example of control algorithm which can be used by the control means of the laser working system to adjust the process control parameters provides for the steps described here below.

a') First of all, the process control parameters are set on those values which are usually chosen depending on the laser source used, as well as on the material and on the thickness of the workpiece.

b') The sensor means detect the signal corresponding to the predetermined wavelength band(s) of the radiation emitted by the process volume. In case at least one of the monitored signals overcomes a given threshold, the control means interpret this excess of emission either as partial closure of the kerf in case of cutting with an inert gas or as incipient loss of control of the reactive process in case of cutting with a reactive gas, and in either case they suitably vary at least one of the process control parameters indicated above, privileging, if possible, the power of the laser and the relative speed. In case at least one of the monitored signals falls below a given threshold, the control means interpret this reduction of emission as a too slow process and suitably vary at least one of the process control parameters indicated above, privileging, if possible, the power of the laser and the relative speed.

Moreover, if the sensor means of the working system comprise a number of photodiodes arranged so as to keep a space correlation with that portion of the process volume which generates the radiation detected by each of the photodiodes, then preferably the control means correlate the detected signal with the cutting direction, thereby making it possible to obtain an information about the anisotropy of behaviour in all the allowed cutting directions. Such an information gives a measure of the offset of the laser beam with respect to the centre of the nozzle of the laser head, i.e. with respect to the direction of the outflow of the assisting gas, and allows therefore to suitably move the centre of mass of the focussing lens or of the nozzle.

Naturally, control algorithms different from those described above can be implemented within the scope of the present invention, subject to the principle of adjusting at least one of the process control parameters mentioned above on the base of the signal relating to the radiation emitted by the process volume in at least one predetermined wavelength band, such predetermined wavelength band including at least one emission line of a gas or of another emitting element present in the process volume during the laser working.

Figure 5:
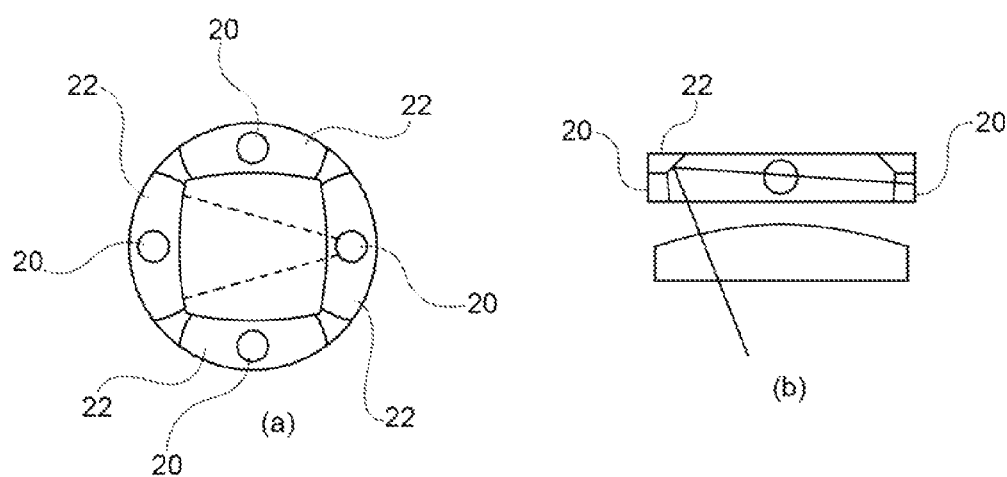
FIGS. 5A and 5B are a view from above and a section view, respectively, of an assembly of deflectors and photodiodes forming part of the sensor means of a process control device such as the one of FIG. 4.

With reference to FIGS. 6 to 11, where components identical or corresponding to those of FIGS. 4 and 5 have been given the same reference numerals, some possible embodiments of the sensor means which can be used in the process control device of a laser cutting system according to the invention will be described now.

Figure 6:
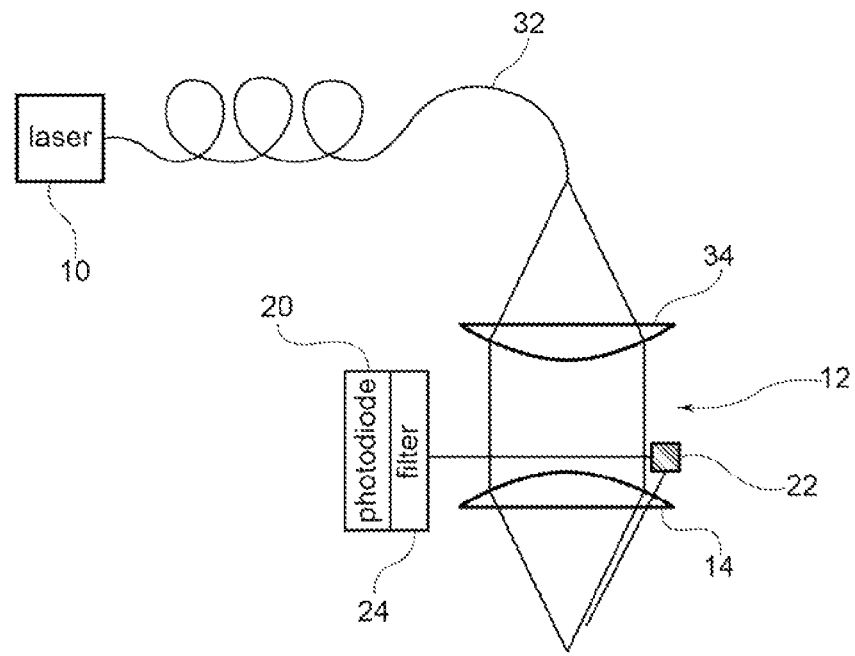
FIGS. 6 to 11 schematically show each a respective variant of embodiment of the sensor means which can be used in the process control device for a laser cutting system according to the invention.

In the embodiment of FIG. 6, the laser cutting system comprises a laser source (not shown) of the solid-state type (Nd:YAG, fiber laser, disc laser, diode laser), in which case the optical path comprises a transport fiber 32 and the laser head 12 further comprises a collimation device 34, which is connected to the final end of the transport fiber 32 and comprises one or more collimation lenses. Also in this case, the sensor means (photodiode 20, reflector/deflector device 22 and optical filter device 24) can be placed above or below the focussing device 14. In the first case, the sensor means will be placed between the focussing device 14 and the collimation device 34, as shown in FIG. 6.

Figure 7:
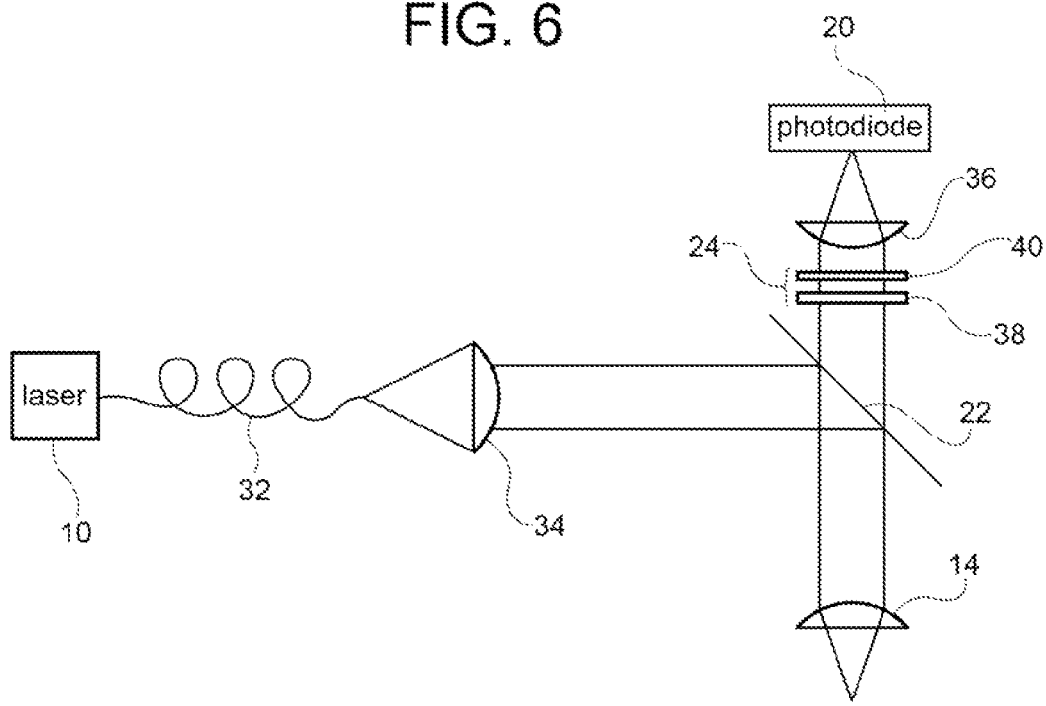

According to the embodiment of FIG. 7, which also refers to the case of a laser cutting system using a laser source of the solid-state type, the reflector/deflector device 22 is formed by a 90-degree deflector, which is placed between the collimation device 34 and the focussing device 14 and is configured so as to reflect at least the 99.9% of the laser radiation and to transmit instead the radiation in the predetermined wavelength band(s). In the proposed example, the sensor means further comprise a focussing lens 36 arranged between the deflector 22 and the photodiode 20 to focus onto this latter the detected signal. Moreover, in the proposed example the optical filter device 24 is arranged between the deflector 22 and the focussing lens 36 and comprises, in the order from the deflector 22 to the focussing lens 36, a first optical filter 38 arranged to cut down the laser radiation and a second optical filter 40 arranged to select the predetermined wavelength band(s). The same configuration of the sensor means can also be obtained with a plurality of photodiodes, of reflector/deflector devices and of optical filter devices, in which case each reflector/deflector device will comprise a respective deflector and a respective focussing lens will be provided between each deflector and the respective photodiode.

According to the embodiments of FIGS. 8 to 11, which also refer to the case of a laser cutting system using a laser source of the solid-state type, there is provided, instead of a 90-degree deflector, a branching device arranged along the optical path and configured so as to allow the laser beam generated by the laser source to be fully transported to the laser head through the transport fiber and to the radiation which is emitted by the process volume and is transported through the transport fiber to be directed onto the photodiode.

Figure 8:
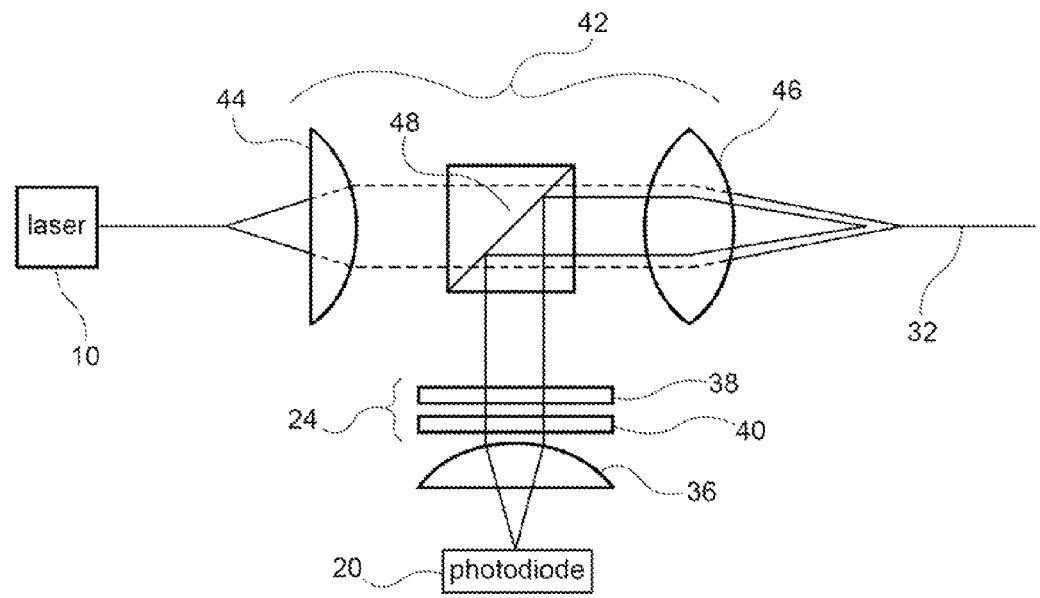

More specifically, according to the embodiment of FIG. 8, an optical coupling device 42 is provided along the optical path, by means of which the laser generated by the laser source is launched in the transport fiber 32, the optical coupling device 42 comprising a collimation lens 44 and a focussing and launching lens 46. In this case, the branching device is integrated in the optical coupling device 42 and comprises a beam splitter 48 arranged between the collimation lens 44 and the focussing and launching lens 46 so as to allow the laser beam generated by the laser source to pass completely through the focussing and launching lens 46 and to the radiation which is emitted by the process volume and is transported through the transport fiber 32 to be directed onto the photodiode 20. As in the embodiment of FIG. 7, the sensor means further comprise a focussing lens 36 arranged between the beam splitter 48 and the photodiode 20 to focus onto this latter the detected signal. Moreover, also in this case the optical filter device 24 is arranged between the beam splitter 48 and the focussing lens 36 and comprises a first optical filter 38 arranged to cut down the laser radiation and a second optical filter 40 arranged to select the predetermined wavelength band(s).

Figure 9:
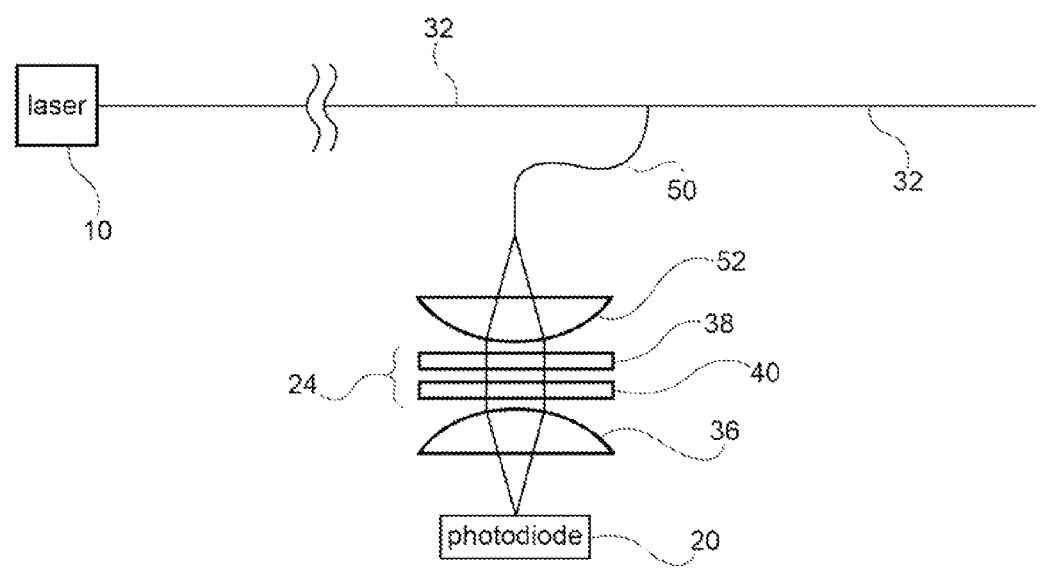
Figure 10:
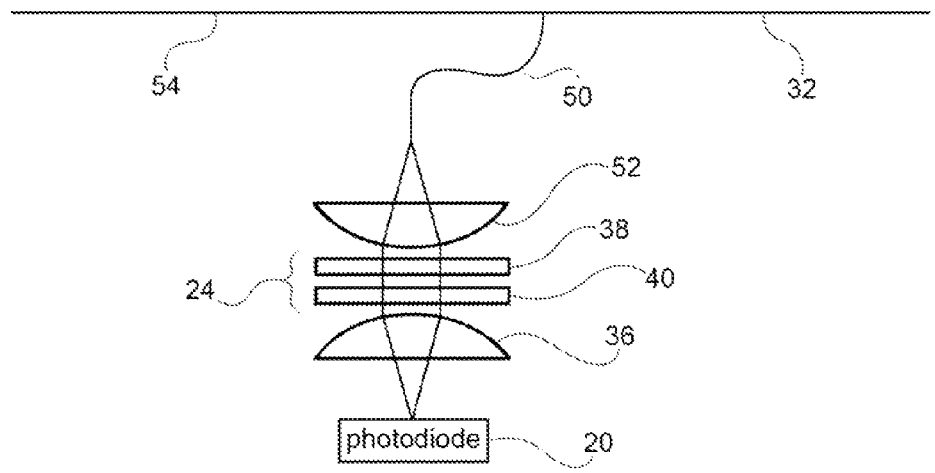
Figure 11:
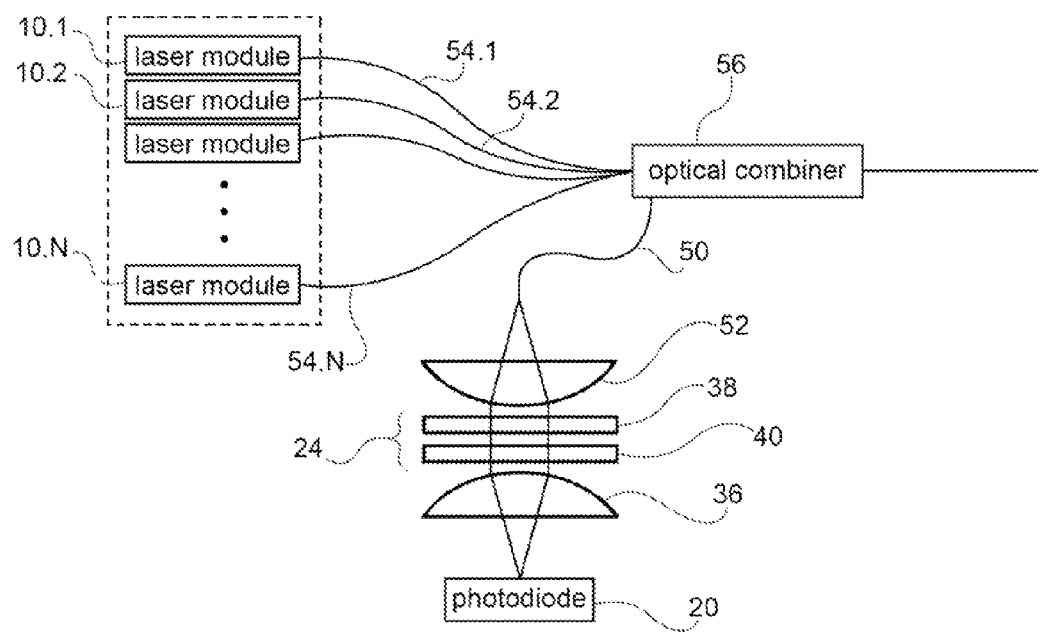

In the embodiments of FIGS. 9 to 11, on the contrary, the branching device comprises a secondary fiber 50 welded to the transport fiber 32.

More specifically, according to the embodiment of FIG. 9, in which the optical path comprises an optical coupling device (not shown) by means of which the laser generated by the laser source is launched in the transport fiber, the secondary fiber 50 is welded to the transport fiber 32 in a point of this latter positioned downstream of the optical coupling device. Also in this case, the sensor means comprise in order, in addition to the secondary fiber 50, a collimation lens 52, an optical filter device 24, a focussing lens 36 and a photodiode 20, the optical filter device 24 comprising in turn a first optical filter 38 arranged to cut down the laser radiation and a second optical filter 40 arranged to select the predetermined wavelength band(s).

According to the embodiment of FIG. 10, the optical coupling device along the optical path is omitted and the secondary fiber 50 is welded to the transport fiber 32 in the same point as the one at which the transport fiber is welded to an output fiber 54 of the laser source. As far as the sensor means are concerned, what has been stated above with reference to FIG. 9 still applies.

Finally, according to the embodiment of FIG. 11, the laser source 10 comprises a plurality of laser modules 10.1, 10.2, . . . , 10.N able to emit a laser beam independently of each other, and a corresponding plurality of output fibers 54.1, 54.2, . . . , 54.N extending each from a respective laser module. The output fibers are connected on the input side to an optical combiner 56, to which the transport fiber 32 is connected on the output side. In this case, the secondary fiber 50 is welded to the optical combiner 56. As far as the sensor means are concerned, what has been stated with reference to FIG. 9 still applies.

Naturally, the principle of the invention remaining unchanged, the modes for carrying out the control method and the embodiments of the laser cutting system may vary widely from those described and illustrated purely by way of non-limiting example.

The invention claimed is:

1. A method for controlling a laser cutting process which provides for irradiation of a workpiece by a laser beam generated by a laser source and focussed by a laser head, as well as for supply of a flow of an assistance gas by a nozzle of the laser head, the control method comprising the steps of:
a) detecting the wavelength signal of the radiation emitted in at least one predetermined wavelength band, which includes the wavelength at 777 nm and has a bandwidth not wider than 100 nm, by the assistance gas or a contaminant gas present in the volume of material irradiated by the focussed laser beam, and
b) adjusting, based on the detected signal, at least one of the process control parameters selected from the group consisting of: the power of the laser, the frequency and the duty cycle of the laser pulse, the pressure of the assistance gas, the relative speed of the laser head with respect to the workpiece, the distance of the nozzle of the laser head from the surface of the workpiece, and distance of the focal point of the laser beam from the surface of the workpiece.

2. The method of claim 1, wherein in order to perform a piercing operation in preparation for cutting, said step b) comprises the following sub-steps:
- b1) switching on the laser source for a first predetermined interval ranging from 0.5 to 5 msec if oxygen is used as the assistance gas, and ranging from 0.5 to 100 msec if a gas other than oxygen is used as the assistance gas;
- b2) switching off the laser source at the end of said first predetermined interval; and
- b3) waiting until the detected wavelength signal has become less than a given threshold, and only then repeating sub-steps b1) and b2).

3. The method of claim 1, wherein said step b) is performed in such a manner that if the wavelength signal detected at step a) exceeds a given threshold, this is interpreted as a partial closure of the kerf in case of cutting with an inert gas or as the beginning of a loss of control of the reactive process in case of cutting with a reactive gas, and at least one of the aforesaid process control parameters is varied accordingly, whereas if the wavelength signal detected at step a) becomes lower than a given threshold, this is interpreted as meaning that the process is too slow, and at least one of the aforesaid process control parameters is varied accordingly.

4. A laser cutting apparatus comprising:
- a laser source;
- a laser head comprising a focussing device for focussing the laser beam generated by the laser source onto a workpiece and a nozzle for supplying an assistance gas;
- an optical path for transporting the laser beam generated by the laser source to the focussing device of the laser head;
- a driving device for moving the laser head and the workpiece with respect to each other with an adjustable speed, as well as for controlling the pressure of the assistance gas, for adjusting the distance of the nozzle from the surface of the workpiece and for adjusting the position of the focal point of the laser beam with respect to the surface of the workpiece; and
- a process control device comprising sensor elements adapted to detect at least one predetermined wavelength band of the radiation emitted by the assistance gas or by a contaminant gas present in the volume of material irradiated by the focussed laser beam, signal processing elements for processing the signal detected by said sensor elements, and control elements for controlling, on the base of the signal received by said signal processing elements the laser source and/or the driving device to adjust at least one of the following process control parameters selected from the group consisting of: the power of the laser, the frequency and the duty cycle of the laser pulse, the pressure of the assistance gas, the relative speed of the laser head with respect to the workpiece, the distance of the nozzle of the laser head from the surface of the workpiece, and distance of the focal point of the laser beam from the surface of the workpiece,
- wherein said predetermined wavelength band includes the wavelength at 777 nm and has a bandwidth not wider than 100 nm.

5. The apparatus of claim 4, wherein said sensor elements comprise a photodiode for detecting said at least one predetermined wavelength band, a reflector/deflector device arranged to direct the radiation emitted by the volume of material irradiated by the focussed laser beam on the photodiode, and an optical filter device interposed between the photodiode and the reflector/deflector device to select said at least one predetermined wavelength band.

6. The apparatus of claim 5, wherein the laser source is a solid-state laser source, wherein the optical path comprises a transport fiber, wherein the laser head comprises a collimation device connected to the final end of the transport fiber, and wherein the reflector/deflector device is a 90-degree deflector arranged to reflect at least the 99.9% of the laser radiation and to transmit the radiation emitted in said at least one predetermined wavelength band.

7. The apparatus of claim 6, wherein said sensor elements further comprise a focussing lens arranged between the reflector/deflector device and the photodiode to focus onto the photodiode the radiation emitted in said at least one predetermined wavelength band, and wherein the optical filter device is arranged between the reflector/deflector device and the focussing lens and comprises a first optical filter arranged to cut down the laser radiation and a second optical filter arranged to select said at least one predetermined wavelength band.

8. The apparatus of claim 4, wherein the laser source is a solid-state laser source, wherein the optical path comprises a transport fiber and wherein said sensor elements comprise a photodiode for detecting said at least one predetermined wavelength band, a branching device arranged along the optical path and configured to allow the laser beam generated by the laser source to be totally transported to the laser head through the transport fiber and the radiation which is emitted by the laser cutting process and is transported through the transport fiber to be directed onto the photodiode, and an optical filter device interposed between the photodiode and the branching device to select said at least one predetermined wavelength band.

9. The apparatus of claim 8, wherein the optical path comprises an optical coupling device comprising a collimation lens and a focussing and launching lens, and wherein the branching device comprises a beam splitter arranged between the collimation lens and the focussing and launching lens so as to allow the laser beam generated by the laser source to pass entirely through the focussing and launching lens and the radiation which is emitted by the laser cutting process and is transported by the transport fiber to be directed onto the photodiode.

10. The apparatus of claim 8, wherein the optical path comprises an optical coupling device and wherein the branching device comprises a secondary fiber welded to the transport fiber at a point of the transport fiber which is positioned downstream of the optical coupling device.

11. The apparatus of claim 8, wherein the transport fiber is welded to an output fiber of the laser source and wherein the branching device comprises a secondary fiber which is welded to the transport fiber at the same point as the one where the transport fiber is welded to the output fiber.

12. The apparatus of claim 8, wherein the laser source comprises a plurality of laser modules capable of emitting a laser beam independently of each other and a corresponding plurality of output fibers each associated with a respective laser module, wherein the optical path comprises an optical combiner to which the output fibers are connected on the input side and to which the transport fiber is connected on the output side, and wherein the branching device comprises a secondary fiber welded to the optical combiner.

* * * * *